United States Patent
Nohren, Jr.

(10) Patent No.: US 6,221,416 B1
(45) Date of Patent: Apr. 24, 2001

(54) DISPENSING AND FILTERING

(75) Inventor: John E. Nohren, Jr., Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

(21) Appl. No.: 09/333,993

(22) Filed: Jun. 16, 1999

Related U.S. Application Data

(60) Provisional application No. 60/096,640, filed on Aug. 14, 1998.

(51) Int. Cl.[7] ............................ B65B 55/00; B01D 24/00; B01D 35/00
(52) U.S. Cl. ........................ 426/394; 426/115; 426/132; 426/112; 210/266; 210/282; 210/474; 210/477
(58) Field of Search ............................ 426/86, 424, 115, 426/112, 85, 132, 394, 506; 210/282, 266, 472, 474, 473, 475, 477

(56) References Cited

U.S. PATENT DOCUMENTS

| | | | |
|---|---|---|---|
| 4,384,960 | * 5/1983 | Polly | 210/753 |
| 5,045,195 | * 9/1991 | Spangrud et al. | 210/266 |
| 5,211,973 | 5/1993 | Nohren | 426/82 |
| 5,273,649 | 12/1993 | Magnusson et al. | 210/232 |
| 5,431,813 | 7/1995 | Daniels | 210/282 |
| 5,525,223 | 6/1996 | Butler | 210/202 |
| 5,609,759 | 3/1997 | Nohren, Jr. | 210/266 |
| 5,674,391 | 10/1997 | Nohren | 210/266 |
| 5,681,463 | * 10/1997 | Shimizu et al. | 210/266 |

OTHER PUBLICATIONS

Patent Abstracts of Japan, vol. 011, No. 184 (C–427), Jun. 12, 1987 & JP 62 007493 A (Hitachi Ltd.), Jan. 14, 1987 abstract.

* cited by examiner

*Primary Examiner*—Gabrielle Brouillette
*Assistant Examiner*—Robert Madsen
(74) *Attorney, Agent, or Firm*—Nixon & Vanderhye P.C.

(57) ABSTRACT

Flavoring, dietary minerals, vitamins, other nutritional supplements, or medicines may be dispensed in a filter assembly designed to cap a neck or open end of a bottle. A cap has a manual valve extending from the top thereof and operatively connected to the bottom thereof is an activated carbon block tubular filter having a porosity of between about 8–120 microns. Disposed within the tubular carbon block is a soluble solid porous element, having a porosity greater than that of the carbon block, and having a solubility between about one quarter and one-one hundredth of sucrose. The soluble element is at least in part a flavoring, vitamin, dietary mineral, nutritional supplement, or medicine. It also may be tubular, and substantially lining the soluble porous element may be a hydrophobic membrane which allows passage of water therethrough under pressure, but not under static pressure conditions.

23 Claims, 2 Drawing Sheets

DISPENSING AND FILTERING

CROSS-REFERENCE TO RELATED APPLICATION

This application is based upon provisional application serial No. 60/096,640 filed Aug. 14, 1998.

BACKGROUND AND SUMMARY OF THE INVENTION

A very successful filter arrangement, primarily for use in significantly reducing the level of chlorine in tap water, is disclosed in U.S. Pat. No. 5,609,759 (the disclosure of which is hereby incorporated by reference herein), and U.S. Pat. No. 6,136,189. The filter body illustrated there is known as a block filter, and comprises a substantially continuous self-supporting, self-venting body of activated carbon and binder, having a porosity of about 8–120 microns (e.g. about 10–120 microns or 20–40 microns, and all other narrower ranges within the broad range).

There are some circumstances under which it is desirable to extend the versatility of the filter assembly as disclosed in the U.S. Pat. No. 5,609,759 patent and above mentioned copending application by dispensing small quantities of desirable materials into the water as it is exiting the bottle through the filter. Particularly desirable to dispense are flavorings, although it is also possible to dispense vitamins, dietary minerals, or medicines in this manner. As a matter of fact almost any desirable material that would be made in porous block form with some but relative low water solubility could be utilized.

According to one aspect of the present invention there is provided a method of dispensing flavorings, minerals, vitamins, or medicines with drinking water using a bottle having a neck or open end through which drinking water is dispensed, comprising: (a) Placing a porous soluble solid element comprising at least in part a flavoring, dietary mineral, vitamin, nutritional supplement, or medicine, in the bottle containing drinking water so that water must flow through the element before passing through the neck or open end. And, (b) positioning the porous solid element in position in the bottle within a filtering element so that water from the bottle will not flow through the filtering element into contact with the porous solid element in a static condition thereof. Preferably the method further comprises (c) positioning a membrane between the porous solid element and the neck or open end to substantially prevent water which has passed through the membrane from going back into contact with the solid porous element.

The method may further comprise (d) providing the solid porous element and membrane as an integral replaceable unit, and (e) replacing the unit when spent. Also the method may further comprise manually valving the flow of water at the neck or open end.

In the method of the invention (a)–(c) may be practiced so that the solid porous element flavoring, nutritional supplement, vitamin, mineral or medicine does not become substantially ineffective until the passage of about 5–30 gallons of water therethrough. This range is effected by solubility and release requirements; which are less than the life of the filter. Preferably (b) is practiced by removing at least 50% (preferably in excess of 80%) of at least one of chlorine and lead from the water at a flow rate of 10 ml/sec using a carbon block filter having a porosity of about 8–120 microns, and including a lead specific zeolite known as ATS if lead removal is desired.

In the method, (a) may be practiced using at least in part a flavoring element having a porosity greater than the porosity of the carbon block filter, and having a solubility between one quarter and one one hundredth that of sucrose. Also in the method (c) may be practiced using a hydrophobic membrane having a negative angle of wetting less than 90°; and (a) may be practiced using a vitamin, dietary mineral and/or nutritional supplement having a solubility one quarter to one one hundredth that of sucrose; and/or using an element having an initial porosity of between about 40–200 microns.

According to another aspect of the present invention a water filter and dispenser of flavorings, vitamins, nutritional supplements, dietary minerals, or medicines assembly is provided for use in capping a bottle neck or open end. The assembly comprises the following elements: A cap having a top and bottom. A manual valve extending upwardly from the cap top. A filtering element operatively connected to the cap bottom. And, a porous soluble solid element comprising at least in part a flavoring, dietary mineral, nutritional supplement, vitamin, or medicine disposed between the filtering element and the valve so that water passing through the filtering element essentially must pass through the porous soluble element before passing through the valve.

In the assembly preferably the filtering element comprises an activated carbon block filter capable of removing at least 50% (e.g. in excess of 80%) of at least one of chlorine or lead in water passing therethrough. Preferably the carbon block filter is tubular, having an open center, and wherein the porous soluble element is disposed within the open center of the tubular carbon block element.

The assembly preferably further comprises a membrane substantially preventing reverse flow of water therethrough under static conditions, but allowing flow of water therethrough from the porous solid element under non-static pressure conditions, the membrane disposed between the porous solid element and the valve. Preferably the membrane and soluble element are both substantially tubular, the membrane substantially lining the soluble element. Typically the membrane is a hydrophobic membrane having a negative angle of wetting of less than 90°.

Preferably the soluble element has a solubility between one quarter and one one hundredth that of sucrose, and a porosity greater than that of the carbon block. If desired the assembly may be constructed so that the membrane substantially covers the soluble element at both top and bottom surfaces thereof in addition to substantially lining the soluble element.

According to yet another aspect of the present invention, an assembly is provided comprising: A substantially tubular carbon block element (perhaps containing ATS) capable of removing at least 50% of at least one of chlorine and lead from water passing therethrough (at 5–10 ml/sec.) and a porosity of 8–120 microns; and a central opening therein. A soluble solid porous element disposed within the central opening of the carbon block element, and having a solubility between about one quarter and about one-one hundredth the solubility of sucrose. And, the soluble element comprising at least in part a flavoring, vitamin, nutritional supplement, dietary mineral, or medicine. The details of the assemblies are preferably as described above.

It is the primary object of the present invention to provide for the effective dispensing of flavorings, vitamins, dietary minerals, other nutritional supplements, and/or medicines in water as the water is filtered and flowing out of a bottle. This and other objects of the invention will become clear from an inspection of the detailed description of the invention and from the appended claims.

DETAILED DESCRIPTION OF THE DRAWINGS

Figure 1:
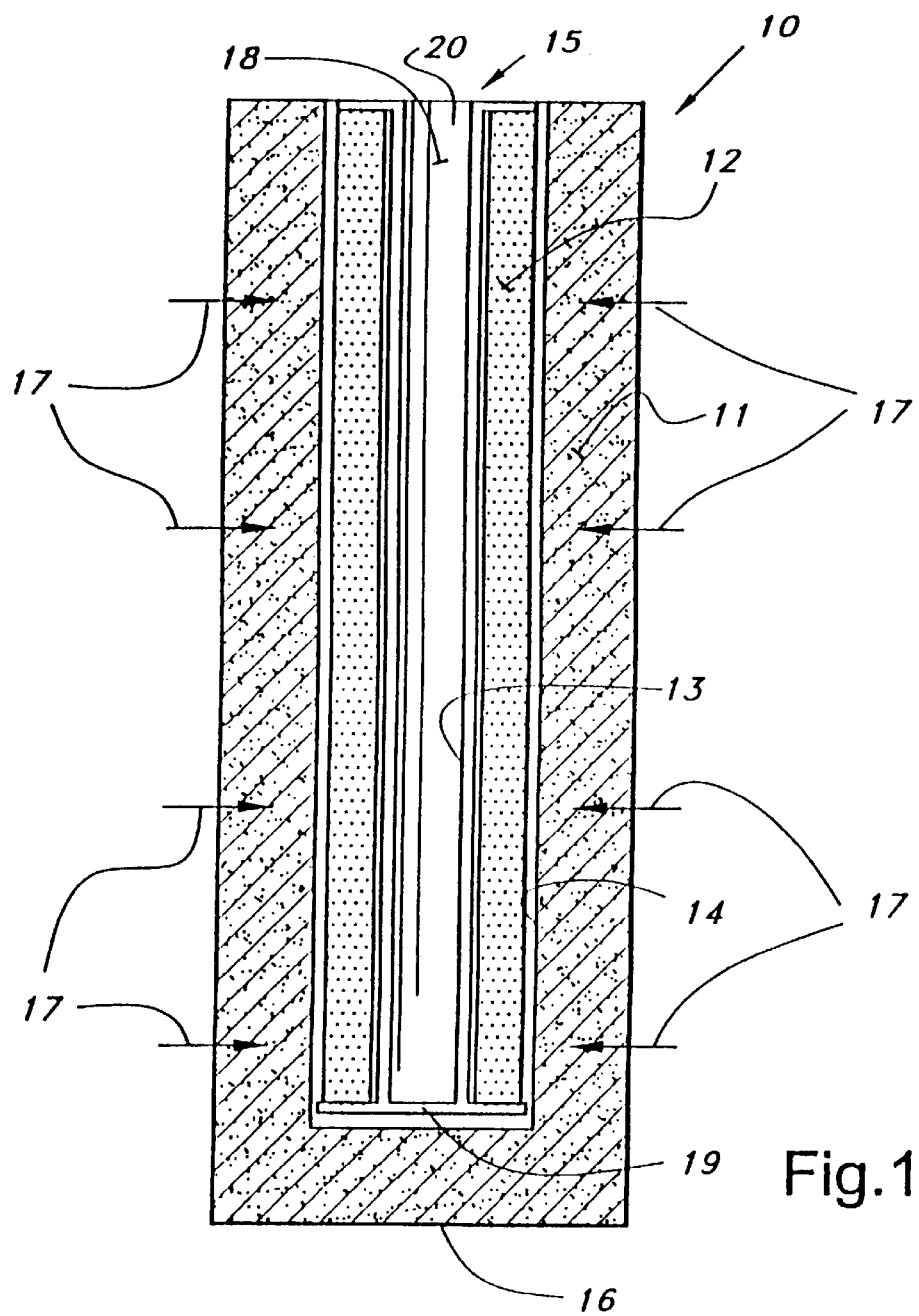
FIG. 1 is a side schematic cross-sectional view of an exemplary dispensing filter element according to the present invention.

FIG. 1 is a side schematic cross-sectional view of an exemplary dispensing filter element according to the present invention, for use in, and in combination with, a bottle filter cap, such as described in U.S. Pat. 5,609,759 and the copending application mentioned above. In the preferred simple embodiment illustrated, the filter element, shown generally by reference numeral 10, comprises three components, a carbon block filter 11, a solid porous form of material to be dispensed 12, and an optional (according to some aspects of the invention) inner membrane 13.

The activated carbon block element 11 typically comprises a mixture of about 30–60% activated carbon, with the rest plastic resin and/or other materials, such as disclosed in U.S. Pat. No. 5,609,759 and the above mentioned copending application, having a porosity of between about 10–120 microns, and may include ATS in the matrix if lead removal is desired, or other materials to remove other contaminants. The material 11 is capable of reducing the level of chlorine in the water passing through it by at least about 50% (e.g. in excess of 80%) at a flow rate of about 5–10 millimeters per second, for about 30–60 gallons of water. The element 11 is substantially tubular in configuration having an open interior volume (typically circular in cross section, but possibly having other cross sections, such as polygonal) 14, an open end 15, and a closed end 16. The flow of water through the element 11 during filtering is primarily (including possibly substantially exclusively) radial as illustrated schematically by the arrows 17 in FIG. 1.

According to the present invention disposed within the hollow interior 14 of the element 11 is a tube of material to be dispensed 12, which has an outside diameter or a cross-sectional area slightly less than the inside diameter or cross-sectional area of the interior 14 of the element 11. The element 12 can be almost any flavor enhancing, dietary mineral or nutritional supplement, and/or medicinal material that is capable of being placed in solid form with a porosity close to the porosity of the element 11, and having water solubility, although the solubility should be relatively low. Preferably the porosity of the element 12—at least initially—is between about 20–200 microns, but the porosity whatever it is at the start will increase as the material forming the matrix of the element 12 dissolves. Preferably the initial porosity of the element 12 is greater than that of the element 11. For example if the porosity of the element 11 is 50 microns, the initial porosity of the element 12 is 51 microns or more, but for example less than 200 microns.

While a wide variety of materials may be used for the element 12, flavoring agents such as cinnamon, fruit (e.g. lemon, lime, cherry), or related essences captured in a matrix for example of an innocuous organic or safe inorganic material, may be utilized. One particular example is Vanillin. However, vitamins, dietary minerals, and other nutritional supplements can alternatively or in addition be provided in the element 12, as can medicines.

The solubility of the material forming the element 12 should be between about one-quarter that of sugar, and about one-one hundredth that of sugar, or sucrose. Ideally, the material 12 lasts about the same length of time as the filter element 11, e.g. about 30–60 gallons, but 5–7 gallons for applications of this type would be acceptable.

Because of the solubility of the element 12, and because water may be retained in the open interior 18 of the element 10 between dispensing actions, according to the invention the structure 13 is preferably provided which prevents the water in the central cavity 18 from contacting the material 12 and thereby dissolving it (which would greatly increase the concentration within the first volume of liquid dispensed from the element 10 each time, and more quickly use up the element 12). The element 13 may be any suitable element which performs the function of preventing the water in the interior 18 from contacting the element 12 to effect dissolution thereof while still allowing passage of liquid therethrough under slightly above atmospheric pressure or suction, but in a preferred embodiment of the invention comprises a hydrophobic membrane, that is having a negative angle of wetting less than 90°. Examples of such a membrane 13 are Teflon and polyethylene. The membrane 13 can be basically in tubular form, having a closed end 19 and an open end 20. The membrane 13 may actually be fitted to the element 12 during manufacture (e.g. covering the top and bottom edges thereof as seen in FIG. 1) or it may merely be an interior sleeve, lining the element 12. In some circumstances the material 12 and membrane 13 combination may be replaced more quickly than the filter element 11, for example having a life only of only one-quarter to one-half of the life of the element 11.

Figure 2:
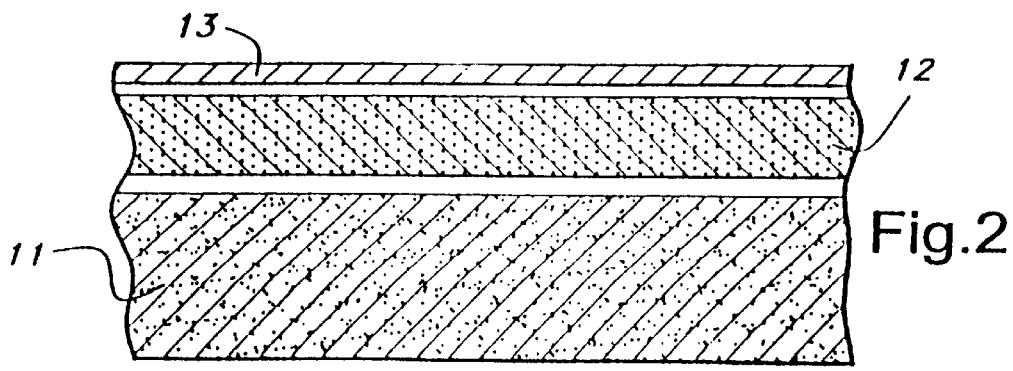
FIG. 2 is a schematic enlarged illustration of the relationship between the three basic components of the assembly of FIG. 1.

FIG. 2 illustrates, schematically, in greatly enlarged form, the relationship between the elements 11, 12 and 13. While the normal pressure of inverting and squeezing a plastic bottle in which the element 10 is disposed allows water to pass through the filter element 11, the flavoring or like material 12, does not normally pass through the filter element 11 into contact with the material 12, nor through the membrane 13, when there is no pressure or suction on the water (i.e. when there is a static orientation).

Figure 3:
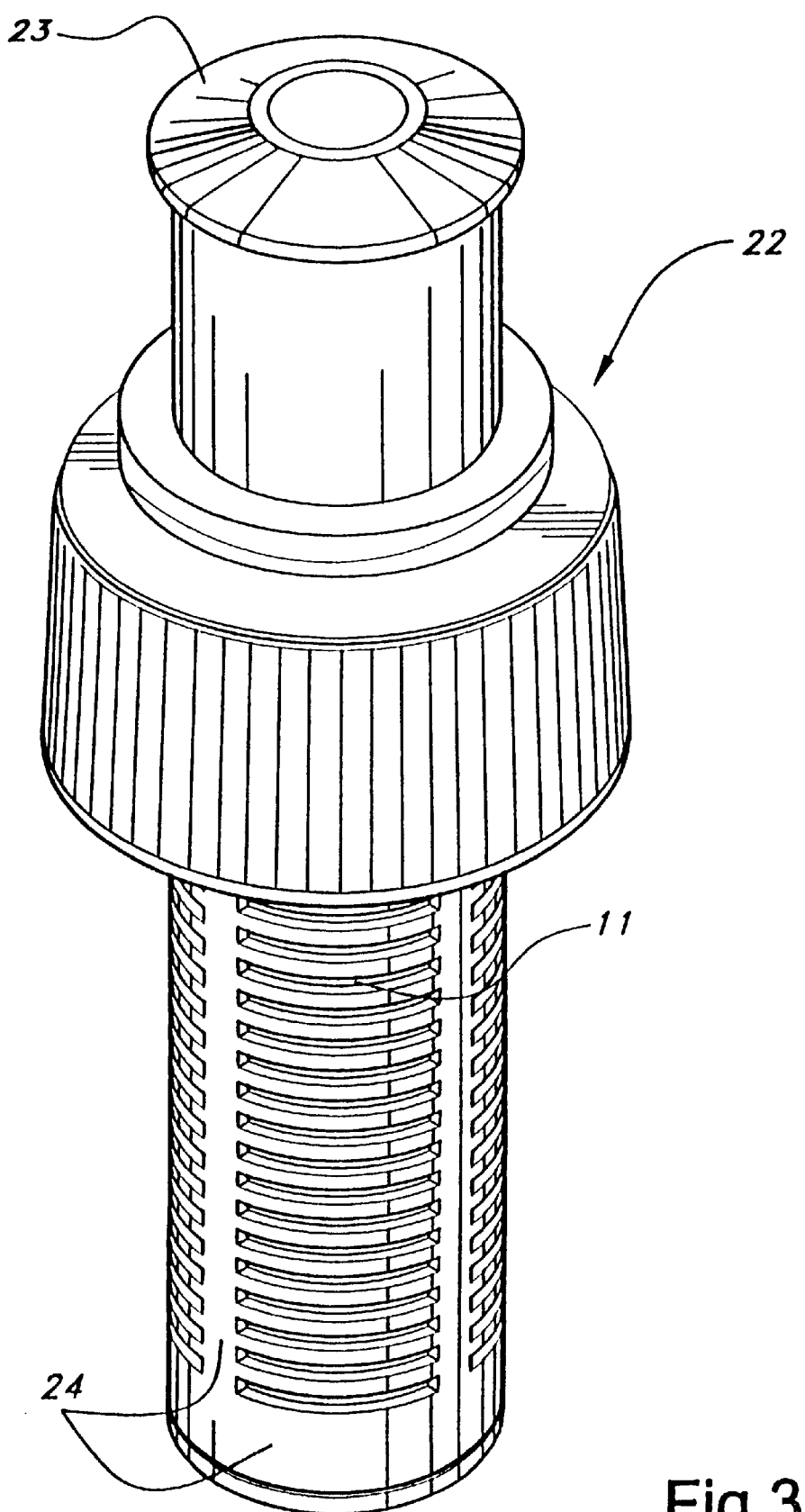
FIG. 3 is a top perspective schematic view of an exemplary cap assembly according to the present invention utilizing the dispensing element of FIGS. 1 and 2.

The assembly 10 may be mounted in any type of configuration for disposition in a bottle, such as show in U.S. Pat. No. 5,609,759 and the copending application mentioned above. One such configuration is illustrated schematically in FIG. 3 where the element 10 is fitted to a plastic cap 22 for a conventional plastic bottle, the cap 22 having a conventional push-pull valve 23 therein which is reciprocated to allow or prevent the flow of liquid therethrough, and an ornamental housing 24 surrounding filter element 11.

Many modifications may be made of the present invention within the scope thereof, which scope is to be accorded the broadest interpretation of the appended claims so as to encompass all equivalent methods and assemblies.

What is claimed is:

1. A method of dispensing flavorings, minerals, vitamins, nutritional supplements, or medicines with drinking water using a bottle having a neck or open end through which drinking water is dispensed, comprising:

(a) placing a porous soluble solid element comprising at least in part a flavoring, dietary mineral, vitamin, nutritional supplement, or medicine, in the bottle containing drinking water so that water must flow through the element before passing through the neck or open end; and (b) positioning the porous soluble solid element in position in the bottle within a filtering element so that water from the bottle will not flow through the filtering element into contact with the porous solid element in a static condition thereof.

2. A method as recited in claim 1 further comprising (c) positioning a membrane between the porous solid element and the neck or open end to substantially prevent water which has passed through the membrane from going back into contact with the solid porous element.

3. A method as recited in claim 2 wherein (a)–(c) are practiced so that the solid porous element flavoring, nutritional supplement, vitamin, dietary mineral, or medicine does not become substantially ineffective until the passage of about 5–30 gallons of water therethrough.

4. A method as recited in claim 2 further comprising (d) providing the solid porous element and membrane as an integral replaceable unit, and (e) replacing the unit when spent.

5. A method as recited in claim 2 wherein (b) is practiced by removing at least 50% of at least one of chlorine and lead from the water using an activated carbon block filter having a porosity of about 8–120 microns.

6. A method as recited in claim 5 wherein (a) is practiced using at least in part a flavoring element having a porosity greater than the porosity of the activated carbon block filter, and having a solubility between one quarter and one-one hundredth that of sucrose.

7. A method as recited in claim 5 wherein (c) is practiced using a hydrophobic membrane having a negative angle of wetting less than 90°.

8. A method as recited in claim 5 wherein (a) is practiced using a vitamin or dietary mineral having a solubility one quarter to one-one hundredth that of sucrose.

9. A method as recited in claim 6 wherein (a) is practiced using an element having an initial porosity of between about 20–200 microns.

10. A method as recited in claim 7 wherein (a) is practiced using an element having an initial porosity of between about 20–200 microns.

11. A method as recited in claim 5 further comprising manually valving the flow of water at the neck or open end.

12. A water filter and dispenser of a flavoring, vitamin, nutritional supplement, dietary mineral, or medicine assembly for use in capping a bottle neck or open end comprising:
    a cap for capping a bottle, and having a top and bottom;
    a manual valve extending upwardly from said cap top;
    a filtering element operatively connected to said cap bottom; and
    a porous soluble solid element comprising at least in part a flavoring, dietary mineral, nutritional supplement, vitamin, or medicine disposed between said filtering element and said valve so that water passing through said filtering element essentially must pass through said porous soluble element before passing through said valve.

13. An assembly as recited in claim 12 wherein said filtering element comprises an activated carbon block filter capable of removing at least 50% of at least one of chlorine or lead in water passing therethrough.

14. An assembly as recited in claim 13 wherein said activated carbon block filter is tubular, having an open center, and wherein said porous soluble element is disposed within said open center of said tubular activated carbon block filter, and wherein said filter is capable of removing in exess of 80% of both chlorine and lead at a flow rate of 10 ml/sec.

15. An assembly as recited in claim 14 further comprising a membrane substantially preventing reverse flow of water therethrough under static conditions, but allowing flow of water therethrough from said porous solid element under non-static pressure conditions, said membrane disposed between said porous solid element and said valve.

16. An assembly as recited in claim 15 wherein said membrane and soluble element are both substantially tubular, said membrane substantially lining said soluble element.

17. An assembly as recited in claim 16 wherein said membrane is a hydrophobic membrane having a negative wetting angle of less than 90°.

18. An assembly as recited in claim 15 wherein said soluble element has a solubility between one quarter and one-one hundredth that of sucrose, and a porosity greater than that of said carbon block.

19. An assembly as recited in claim 16 wherein said membrane substantially covers said soluble element at both top and bottom surfaces thereof in addition to substantially lining said soluble element.

20. An assembly comprising:
    a substantially tubular activated carbon block filter element capable of removing at least 50% of at least one of chlorine and lead from water passing therethrough, a porosity of 8–120 microns, and a central opening therein;
    a soluble solid porous element disposed within said central opening of said carbon block element, and having a solubility between about one quarter and about one-one hundredth the solubility of sucrose; and
    said soluble element comprising at least in part a flavoring, vitamin, nutritional supplement, dietary mineral, or medicine.

21. An assembly as recited in claim 20 wherein said soluble element is substantially tubular; and further comprising a water permeable hydrophobic membrane having a negative angle of wetting of less than 90° disposed within and substantially lining said soluble element.

22. An assembly as recited in claim 21 wherein said membrane substantially covers said soluble element at both top and bottom surfaces thereof in addition to substantially lining said soluble element.

23. A water filter assembly for use in capping a bottle neck or open end comprising:
    a cap for capping a bottle, and having a top and bottom;
    a manual valve extending upwardly from said cap top;
    a filtering element operatively connected to said cap bottom; and
    said filtering element comprising an activated carbon block filter having ATS incorporated therein, and capable of removing in excess of 80% of both lead and chlorine at a flow rate of about 10 ml/sec, said carbon block filter having a a porosity of about 8–120 microns.

* * * * *